United States Patent
Whalen et al.

(10) Patent No.: US 9,489,575 B1
(45) Date of Patent: Nov. 8, 2016

(54) SENSOR-BASED NAVIGATION CORRECTION

(71) Applicant: Rockwell Collins, Inc., Cedar Rapids, IA (US)

(72) Inventors: Donald J. Whalen, Cedar Rapids, IA (US); Brad A. Walker, Mount Vernon, IA (US); Scott E. Schultz, Cedar Rapids, IA (US); Ronald E. Heberlein, Wilsonville, OR (US); David I. Han, Lake Oswego, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 88 days.

(21) Appl. No.: 14/609,651

(22) Filed: Jan. 30, 2015

(51) Int. Cl.
| | |
|---|---|
| *G06K 9/00* | (2006.01) |
| *G01C 23/00* | (2006.01) |
| *G01S 13/94* | (2006.01) |
| *G08G 5/00* | (2006.01) |
| *G06T 7/60* | (2006.01) |
| *G06T 7/00* | (2006.01) |
| *G06T 7/20* | (2006.01) |
| *G06T 17/05* | (2011.01) |
| *G01S 13/95* | (2006.01) |
| *G08G 5/02* | (2006.01) |

(52) U.S. Cl.
CPC ........... *G06K 9/00651* (2013.01); *G01C 23/00* (2013.01); *G01S 13/94* (2013.01); *G01S 13/953* (2013.01); *G06K 9/00476* (2013.01); *G06T 7/004* (2013.01); *G06T 7/20* (2013.01); *G06T 7/60* (2013.01); *G06T 17/05* (2013.01); *G08G 5/0021* (2013.01); *G08G 5/02* (2013.01)

(58) Field of Classification Search
None
See application file for complete search history.

(56) References Cited

U.S. PATENT DOCUMENTS

| | | | | |
|---|---|---|---|---|
| 7,605,719 B1* | 10/2009 | Wenger | ................... | G01C 23/00 340/974 |
| 7,965,202 B1* | 6/2011 | Chiew | .................... | G01C 23/00 340/973 |
| 8,094,188 B1* | 1/2012 | Yum | ..................... | G01C 23/005 340/974 |
| 8,264,498 B1* | 9/2012 | VanDerKamp | ...... | G01C 21/005 340/980 |
| 8,462,019 B1* | 6/2013 | VanDerKamp | ...... | G01C 23/005 340/426.22 |
| 8,493,241 B2* | 7/2013 | He | .......... | G01C 23/00 340/945 |
| 8,498,758 B1* | 7/2013 | Bell | ....... | G01C 5/005 244/180 |
| 8,654,149 B2* | 2/2014 | He | ........ | G01C 23/005 345/632 |
| 8,767,013 B2* | 7/2014 | Jain | ........ | G06T 15/503 340/945 |
| 2010/0250030 A1* | 9/2010 | Nichols | ................ | G01C 23/005 701/7 |
| 2012/0310450 A1* | 12/2012 | Srivastav | ............. | G08G 5/0021 701/3 |

OTHER PUBLICATIONS

M. C. Ertem, "An airborne synthetic vision system with HITS symbology using X-Plane for a head up display," 24th Digital Avionics Systems Conference, 2005, pp. 6 pp. vol. 2-.*

* cited by examiner

*Primary Examiner* — Utpal Shah

(74) *Attorney, Agent, or Firm* — Angel N. Gerdzhikov; Donna P. Suchy; Daniel M. Barbieri

(57) ABSTRACT

A system and method for providing sensor-based navigation correction of a GPS-sensed position of an aircraft includes a synthetic vision system. The synthetic vision system captures a visual image of the surrounding area via image sensors and generates a location model based on the image. A georeference engine compares the location model to static high-resolution terrain and obstacle databases to determine a corrected position of the aircraft. The georeference engine then updates the GPS-sensed position with the corrected position, transmitting the corrected position to the combiner. The combiner generates for display an enhanced image based on the visual image and the corrected position of the aircraft.

20 Claims, 3 Drawing Sheets

SENSOR-BASED NAVIGATION CORRECTION

TECHNICAL FIELD

The inventive concepts disclosed herein relate generally to avionics systems, and more particularly to a synthetic vision system (SVS) for correcting inaccuracies in the synthetic vision display resulting from position errors.

BACKGROUND

Synthetic vision systems (SVS) can provide pilots and crews with enhanced situational awareness in low visibility environments such as those resulting from darkness or adverse weather conditions. For example, during approach and landing segments, it is critical for the pilot to clearly perceive the runway and any obstacles that might interfere with a stable approach. However, neither the runway nor the surrounding environment may be clearly visible. In addition, synthetic vision systems may enhance situational awareness during other flight segments; for example, providing information about glide slope or recovery from unusual attitude under extreme conditions.

Synthetic vision systems generally incorporate an enhanced vision system (EVS) including multiple sensors (such as optical or infrared cameras) configured to extract visual information in a low-visibility environment. However, EVS visual sensors may not always provide the pilot with all available visual intelligence. For example, EVS sensors may not be able to detect LED runway lighting. Different sensors may provide higher, or lower, visibility depending on environmental conditions (e.g., smoke, fog, darkness). Additionally, position errors associated with GPS receivers may result in imprecise results from the SVS. In other words, under low-visibility or zero-visibility conditions where the pilot is dependent on the SVS, a GPS error of several feet may result in the aircraft being portrayed by the SVS as occupying a different location than it actually occupies. Imprecise SVS results may lead the pilot to attempt approach or landing in an undesirable location, or forgo a landing in a desirable location. More critically, a combination of detailed environmental information and imprecise position data may cause the aircraft to collide with an avoidable obstacle. In underserved or GPS-denied areas, the pilot may not be able to rely on GPS information at all. It may therefore be desirable to enhance the accuracy of both the visual intelligence and position information provided to the SVS.

SUMMARY

The inventive concepts disclosed herein are directed to a synthetic vision system (SVS) for an aircraft, incorporating enhanced visual sensors and navigational correction of position errors. In one embodiment, the SVS includes a position sensor (e.g., GPS or GNSS receiver, attitude sensor) configured to determine coordinates corresponding to a sensed position of the aircraft. In one embodiment, the SVS includes one or more onboard image sensors (e.g., optical, infrared, and/or ranged sensors) configured to capture a forward image based on the actual physical position of the aircraft. In one embodiment, the SVS includes a georeference engine which generates a location model based on the captured image. In one embodiment, the georeference engine determines a coordinate set corresponding to a corrected sensed position of the aircraft (i.e., a sensed position more closely corresponding to the actual position of the aircraft) by comparing the location model to one or more high-resolution terrain databases. In one embodiment, the georeference engine updates the sensed position of the aircraft with the corrected position. In one embodiment, the SVS includes a combiner which generates an enhanced image based on the captured image, which may include an overlay of navigation data based on the corrected position of the aircraft. In one embodiment, the SVS includes a display unit which displays to the pilot or crew the enhanced images generated by the combiner.

In a further aspect, the inventive concepts disclosed herein are directed to a method for providing synthetic vision aboard an aircraft. In one embodiment, the method includes determining, via position sensors, a first coordinate set of corresponding to a location of the aircraft. In one embodiment, the method includes updating with coordinates of the first set a second coordinate set corresponding to the currently sensed position of the aircraft. In one embodiment, the method includes capturing a visual image based on the actual location of the aircraft via one or more image sensors. In one embodiment, the method includes generating a location model based on the visual image. In one embodiment, the method includes determining a third coordinate set more closely corresponding to the actual location of the aircraft by comparing the location model to one or more high-resolution terrain databases. In one embodiment, the method includes updating the second coordinate set with coordinates of the third set. In one embodiment, the method includes generating an enhanced image based on the captured visual image and the position coordinates of the third coordinate set. In one embodiment, the method includes displaying the enhanced image to the pilot or crew.

It is to be understood that both the foregoing general description and the following detailed description are exemplary and explanatory only and are not necessarily restrictive of the inventive concepts disclosed herein as claimed. The accompanying drawings, which are incorporated in and constitute a part of the specification, illustrate embodiments of the inventive concepts disclosed herein and together with the general description, serve to explain the principles of the inventive concepts.

BRIEF DESCRIPTION OF THE FIGURES

The advantages of the inventive concepts disclosed herein may be better understood by those skilled in the art by reference to the accompanying figures in which.

DETAILED DESCRIPTION

Features of the inventive concepts disclosed herein in their various embodiments are exemplified by the following descriptions with reference to the accompanying drawings, which describe the invention with further detail. These drawings depict only selected embodiments of the invention, and should not be considered to limit its scope in any way.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Figure 1:
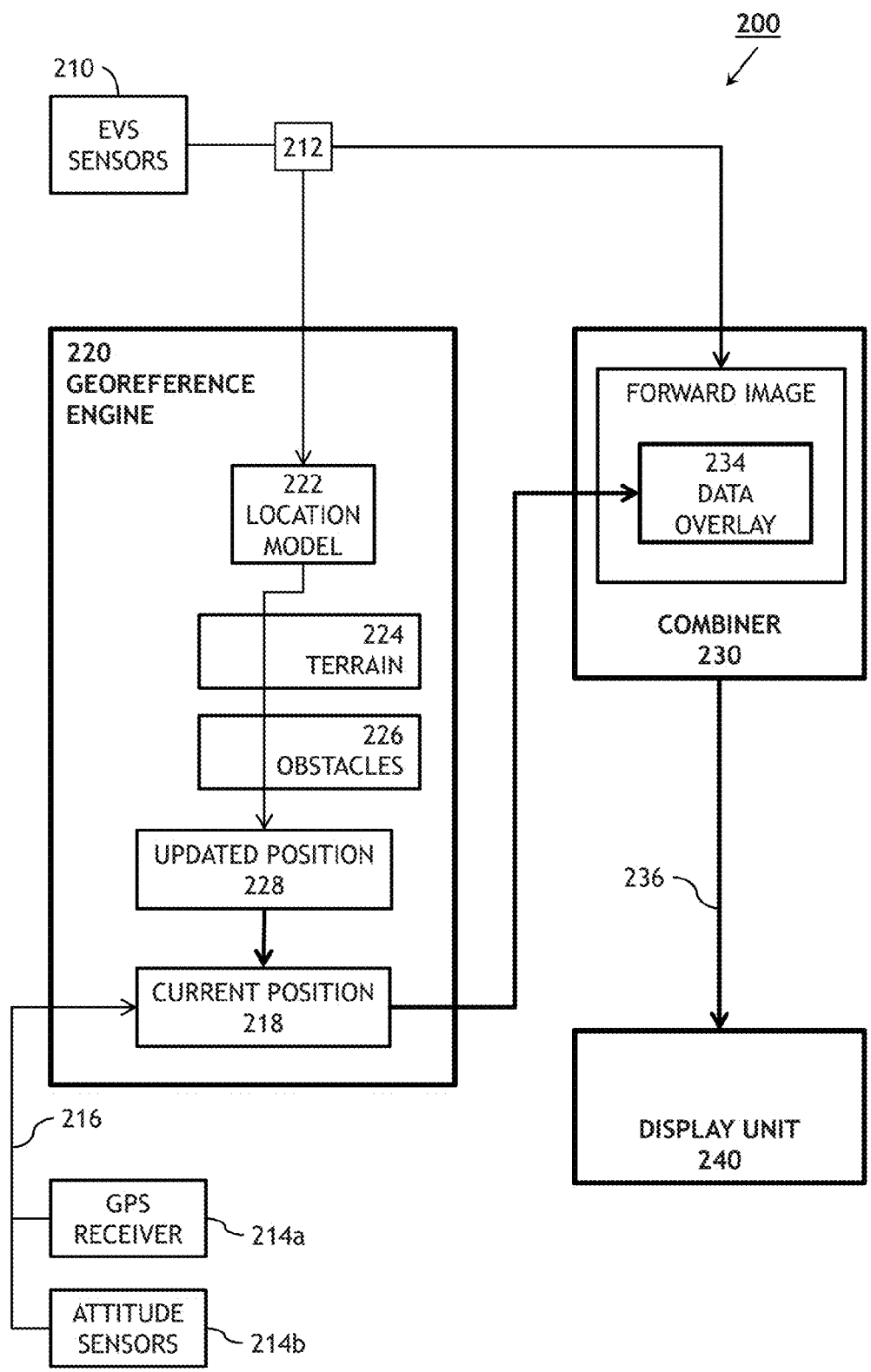
FIG. 1 is a block diagram of a synthetic vision system with sensor-based navigation correction according to embodiments of the inventive concepts disclosed herein.

FIG. 1 is a block diagram of a synthetic vision system (SVS) 200 of an aircraft with sensor-based navigational correction according to embodiments of the inventive concepts disclosed herein. In one embodiment, enhanced vision system (EVS) sensors 210 continually (ex.—at preset intervals) capture image data 212 based on the forward environment of the aircraft. For example, visual image 212 may be a two-dimensional image of the area in front of the aircraft, captured by one or more optical or infrared (e.g., short-wavelength/SWIR, mid-wavelength/MWIR, long-wavelength/LWIR) cameras. Visual image 212 may also be a three-dimensional image (i.e., a two-dimensional image including ranging information) captured by one or more radar, LIDAR, or other similar ranging sensors. In one embodiment, EVS sensors 210 include a combination of two-dimensional and three-dimensional (ranging) sensors. In one embodiment, EVS sensors 210 include a Laser Imaging Through Obscurants (LITO) sensor or similar laser-based imaging systems configured to observe objects and targets through a variety of obscurants (e.g., rain, fog, dust, smoke, fire). The preferred sensor or sensors used in given environment may vary with the conditions prevalent in that environment as well as the desired operating objectives. For example, some EVS sensors 210 may provide more precise image resolution at the cost of effective operating range. in one embodiment, visual image 212 is used by georeference engine 220 to correct position data 216 determined by one or more position sensors 214. For example, an onboard GPS receiver 214a (or similar GNSS satellite-based receiver) may generate coordinates 216 corresponding to a sensed position (ex.—location) of the aircraft. In one embodiment, position sensors 214 include attitude sensors 214b for determining a rotational orientation of the aircraft (e.g., relative yaw, pitch and roll), such that coordinates 216 corresponding to the position of the aircraft include at least six degrees of freedom (three translational, three rotational).

In one embodiment, georeference engine 220 includes one or more processors that generate a location model 222 based on the sensed visual image 212. For example, location model 222 may be a point cloud corresponding to a single two-dimensional image 212 or to a sequence of 2D images. In one embodiment, location model 222 includes a point cloud generated from one or more ranged 2D images 212 and corresponding to a three-dimensional representation of space relative to the aircraft. For example, location model 222 may include a point cloud wherein each individual point generated includes a relative distance (ex.—range) to the ranged EVS sensor 210 (e.g., derived from time in flight), enabling the location model 222 to plot the relative location of the aircraft. Location model 222 may include a terrain model in which polygonal tiles or a drape effect of varying z-height are generated to approximate the topography and obstacles of the sensed area in three dimensions. In one embodiment, the georeference engine 220 determines position coordinates 228 by comparing a location model 222 to one or more static high-resolution terrain databases 224. In one embodiment, position coordinates 228 correspond to a corrected or refined determination of the position data 216 sensed by position sensors 214. For example, the georeference engine 220 may determine, based on the terrain patterns (e.g., terrain tiling) of location model 222, how the terrain patterns of location model 222 (and thus the corresponding area) correspond to reference data in terrain database 224. The georeference engine 220 may therefore determine to a preprogrammed degree of confidence the specific area or space to which the location model 222 corresponds as well as the position of the aircraft relative to the area or space, as indicated by the perspective, angle, or z-height from which the area or space is visually sensed. In one embodiment, the georeference engine 220 compares the location model 222 to one or more obstacle databases 226, allowing buildings, towers, power lines, runways, and other infrastructure elements to be identified by their size or position relative to the aircraft. In one embodiment, the initial sensed position 216 of the aircraft may differ from the actual physical position of the aircraft by a given delta $\Delta_i$ due to GPS error. The coordinates 228 determined by the georeference engine 220 (and corresponding to the generated location model 222) may differ from the actual position of the aircraft by a second delta $\Delta_2$, such that $\Delta_2 < \Delta_1$. In one embodiment, the georeference engine 220 can correct the sensed position 216 of the aircraft to within a fraction of a meter from its actual physical position.

In one embodiment, the georeference engine 220 updates the coordinates 218 corresponding to the current position of the aircraft with the corrected coordinates 228. For example, current coordinates 218 may correspond to the coordinates 216 sensed by position sensors 214, and may therefore include GPS-based position errors of up to several meters. The georeference engine 220 can resolve these errors by substituting its own corrected coordinates 228. In one embodiment, once the current position 218 of the aircraft is updated with corrected coordinates 228, the georeference engine 220 forwards the corrected current position 218 to the combiner 230 of SVS 200. In one embodiment, the combiner 230 generates an enhanced image 236 for display by mapping data based on the corrected current position 218 of the aircraft to the sensed visual image 212.

Figure 2:
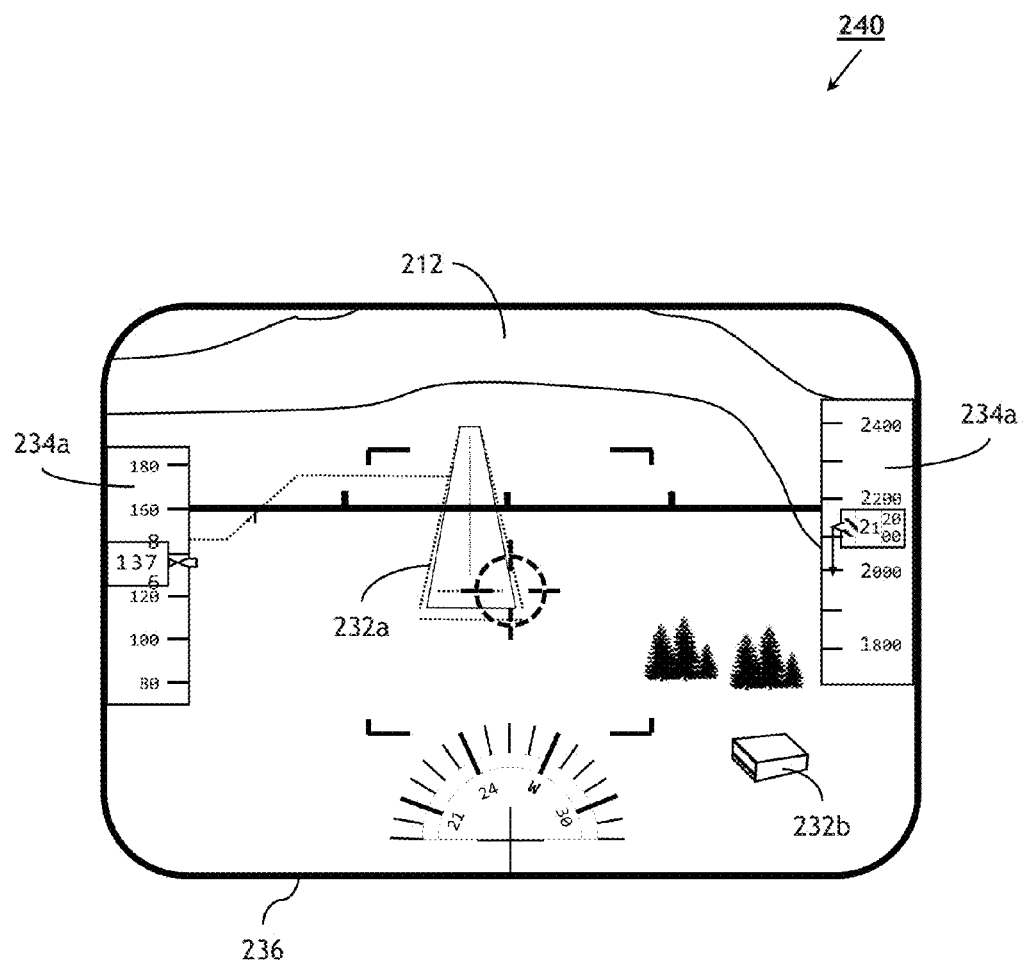
FIG. 2 is an illustration of a display unit of a synthetic vision system according to embodiments of the inventive concepts disclosed herein.

FIG. 2 illustrates a display unit 240 of a synthetic vision system 200 with sensor-based navigational correction according to embodiments of the inventive concepts disclosed herein. In one embodiment, display unit 240 is configured for heads-up display. In one embodiment, display unit 240 displays an enhanced image 236 generated by the combiner 230. For example, enhanced image 236 may include the visual image 212 captured by the EVS sensors. In one embodiment, enhanced image 236 includes a data overlay 234. For example, data overlay 234 can include data points based on the corrected location 228 of the aircraft or other data points based on the comparison of location model 224 with terrain and obstacle databases 226, 228. In one embodiment, a displayed data point 234a includes an altitude, a velocity, a heading, a glide slope, a horizon line, airport approach data, or a legend corresponding to at least one of a natural feature or an obstacle. For example, manmade structures 232a identified in an obstacle database 226 (e.g., buildings, towers, runways, highways) may include additional information about a specific obstacle. In one embodiment, a displayed data point 234a is a representation of terrain. For example, under conditions of extremely low visibility when the captured visual image 212 is incomplete or lacking in detail, the enhanced image 236 may include a synthetic representation of terrain tiles or contour lines corresponding to terrain conditions in the area (e.g., elevations, land vs. water, natural features). In one embodiment, a displayed data point 234a includes a feature not included in an obstacle database. For example, the enhanced image 236 may include structure 232b, which does not correspond to an item in obstacle database 226. Structure 232b may have been substantially constructed between revisions of obstacle database 226 and thus may not be referenced in the current version of obstacle database 226 accessed by the georeference engine 220. However, certain types of EVS sensors 210 may capture a visual image 212 of sufficient resolution to display structure 232b. In one embodiment, terrain database 224 includes one or more Digital Terrain Elevation Data (DTED) datasets.

Figure 3:
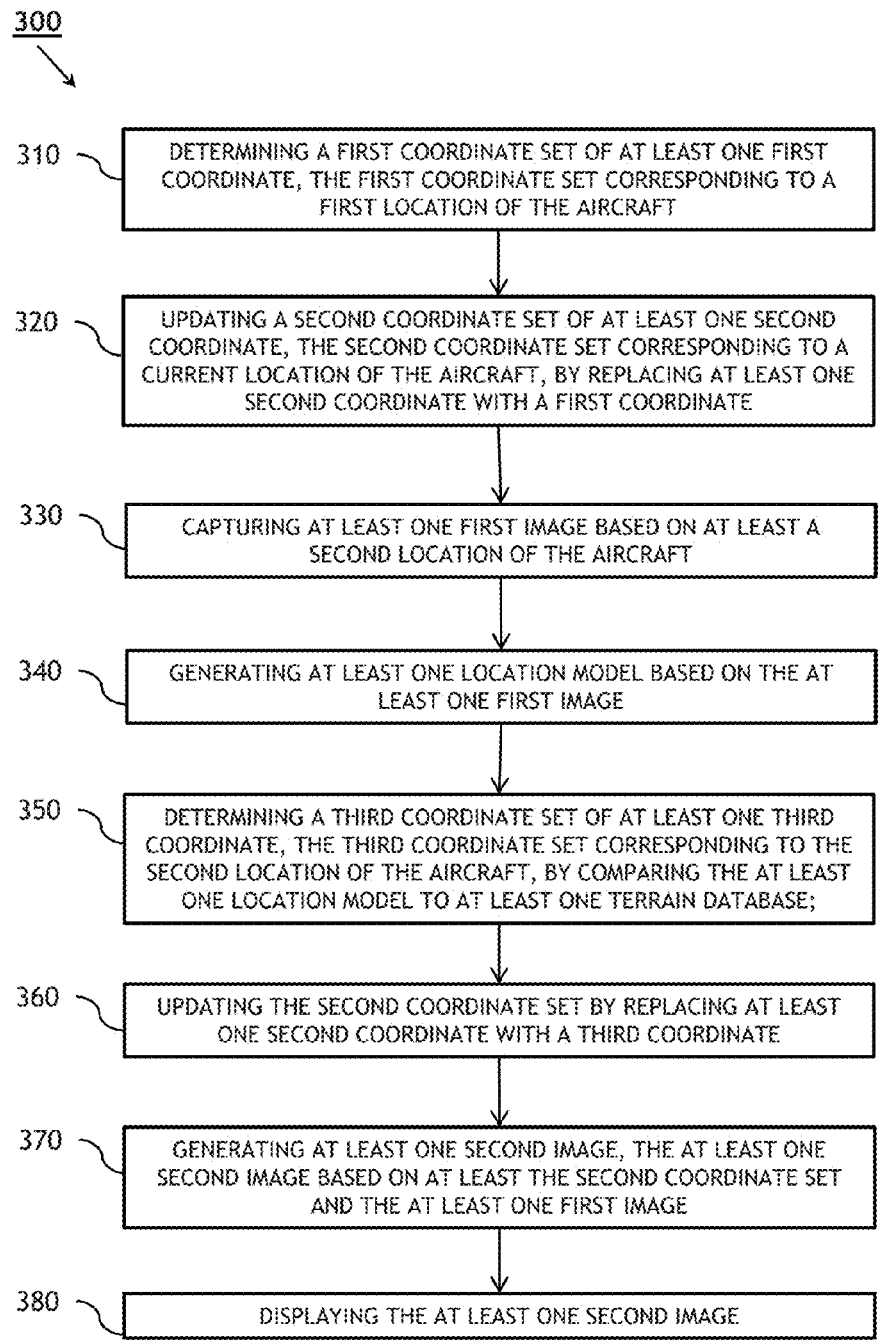
FIG. 3 is a process flow diagram illustrating a method for providing synthetic vision aboard an aircraft according to embodiments of the inventive concepts disclosed herein.

FIG. 3 illustrates a process flow diagram of a method 300 for providing sensor-based navigational correction aboard an aircraft according to an embodiment of the inventive concepts disclosed herein. It is noted herein that the method 300 may be carried out utilizing any of the embodiments described previously. It is further noted, however, that method 300 is not limited to the components or configurations described previously as multiple components and/or configurations may be suitable for executing method 300.

At step 310, the method 300 determines a first coordinate set 216 of at least one first coordinate, the first coordinate set 216 corresponding to a first location of the aircraft. In one embodiment, the first coordinate set 216 may be determined by at least one of a GPS receiver 214a, a GNSS receiver, and an attitude sensor 214b. At step 320, the method 300 updates a second coordinate set 218 of at least one second coordinate, the second coordinate set 218 corresponding to a current location of the aircraft, by replacing at least one second coordinate with a first coordinate.

At step 330, the method 300 captures at least one first image 212 based on at least a second location of the aircraft. In one embodiment, the at least one first image 212 includes at least one of a two-dimensional image and a three-dimensional virtual representation of a space. In one embodiment, the method 300 captures at least one first image 212 via at least one of a radar sensor, a LIDAR sensor, a Laser Imaging Through Obscurants (LITO) sensor, an optical camera, and a stereo camera. At step 340, the method 300 generates at least one location model 222 based on the at least one first image 212. In one embodiment, the at least one location model 222 includes a point cloud based on the at least one first image 212.

At step 350, the method 300 determines a third coordinate set 228 of at least one third coordinate, the third coordinate set 228 corresponding to the second location of the aircraft, by comparing the at least one location model 222 to at least one terrain database 224. In one embodiment, the at least one terrain database 224 includes at least one of a Digital Terrain Elevation Data (DTED) dataset and an obstacle database 226. At step 360, the method 300 includes updating the second coordinate set 218 by replacing at least one second coordinate with a third coordinate.

At step 370, the method 300 generates at least one second image 236, the at least one second image 236 based on at least the second coordinate set 218 and the at least one first image 212. In one embodiment, the at least one second image 236 includes a data overlay 234, the data overlay 234 including at least one data point based on at least one of the second coordinate set 218 and the first image 212. In one embodiment, the at least one data point includes at least one of an altitude, an airport approach, a status of an aircraft component, a glide slope, a velocity, a legend corresponding to an obstacle, a feature not included in the obstacle database, and a heading. At step 380, the method 300 displays the at least one second image 236.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

We claim:

1. A synthetic vision system for an aircraft, comprising:
at least one position sensor configured to:
   (a) determine a first coordinate set of at least one first coordinate, the first coordinate set corresponding to a first location of the aircraft; and
   (b) update a second coordinate set of at least one second coordinate, the second coordinate set corresponding to a current location of the aircraft, by replacing at least one second coordinate with the at least one first coordinate;
at least one image sensor configured to capture at least one first image based on a second location of the aircraft;
at least one georeference engine coupled with the at least one image sensor and the at least one position sensor, the georeference engine configured to:
   (a) generate at least one location model based on the at least one first image;
   (b) determine a third coordinate set of at least one third coordinate, the third coordinate set corresponding to the second location of the aircraft, by comparing the at least one location model to at least one terrain database; and (c) update the second coordinate set by replacing at least one second coordinate with the at least one third coordinate;

at least one combiner coupled with the at least one position sensor and the at least one image sensor, the at least one combiner configured to generate at least one second image based on at least the second coordinate set and the at least one first image; and at least one display unit coupled with the at least one combiner, the at least one display unit configured to display the at least one second image.

2. The synthetic vision system of claim 1, wherein the at least one display unit includes a heads-up display.

3. The synthetic vision system of claim 1, wherein the at least one position sensor includes at least one of a GPS receiver, a GNSS receiver, and an attitude sensor.

4. The synthetic vision system of claim 1, wherein the at least one first coordinate, the at least one second coordinate, and the at least one third coordinate correspond to at least one of a latitude, a longitude, an altitude, a yaw component, a pitch component, and a roll component.

5. The synthetic vision system of claim 1, wherein the at least one image sensor includes at least one of a radar sensor, a LIDAR sensor, a Laser Imaging Through Obscurants (LITO) sensor, an infrared (IR) sensor, an optical camera, and a stereo camera.

6. The synthetic vision system of claim 1, wherein the at least one first image includes at least one of a two-dimensional image, a two-dimensional ranged image, and a three-dimensional virtual representation of a space.

7. The synthetic vision system of claim 1, wherein the first location has a first delta representing the difference between the first location and the physical location of the aircraft, and the second location has a second delta representing the difference between the second location and the physical location of the aircraft, the second delta less than the first delta.

8. The synthetic vision system of claim 1, wherein the at least one terrain database includes at least one of a DTED dataset and an obstacle database.

9. The synthetic vision system of claim 1, wherein the at least one second image includes at least one data overlay, the at least one data overlay including at least one data point based on at least one of the second coordinate set and the first image.

10. The synthetic vision system of claim 9, wherein the at least one data point includes at least one of an altitude, an airport approach, a status of an aircraft component, a glide slope, a velocity, a legend corresponding to at least one of a natural feature or an obstacle, a representation of a three-dimensional surface, a feature not included in the obstacle database, and a heading.

11. The synthetic vision system of claim 1, wherein the at least one location model includes at least one of a point cloud corresponding to a three-dimensional space and a polygonal tile corresponding to a three-dimensional surface.

12. The synthetic vision system of claim 1, wherein the system is embodied in an aircraft.

13. A method for providing sensor-based navigational correction aboard an aircraft, comprising:

determining a first coordinate set of at least one first coordinate, the first coordinate set corresponding to a first location of the aircraft;

updating a second coordinate set of at least one second coordinate, the second coordinate set corresponding to a current location of the aircraft, by replacing at least one second coordinate with the at least one first coordinate;

capturing at least one first image based on at least a second location of the aircraft;

generating at least one location model based on the at least one first image;

determining a third coordinate set of at least one third coordinate, the third coordinate set corresponding to the second location of the aircraft, by comparing the at least one location model to at least one terrain database;

updating the second coordinate set by replacing at least one second coordinate with the at least one third coordinate;

generating at least one second image, the at least one second image based on at least the second coordinate set and the at least one first image; and displaying the at least one second image.

14. The method of claim 13, wherein determining a first coordinate set of at least one first coordinate includes:

determining a first coordinate set of at least one first coordinate via at least one of a GPS receiver, a GNSS receiver, and an attitude sensor.

15. The method of claim 13, wherein capturing at least one first image based on at least a second location of the aircraft includes:

capturing at least one of a two-dimensional image and a three-dimensional virtual representation of a space.

16. The method of claim 13, wherein capturing at least one first image based on at least a second location of the aircraft includes:

capturing at least a first image based on at least a second location of the aircraft via at least one of a radar sensor, a LIDAR sensor, a Laser Imaging Through Obscurants (LITO) sensor, an infrared (IR) sensor, an optical camera, and a stereo camera.

17. The method of claim 13, wherein generating at least one location model based on the at least one first image includes:

generating at least one point cloud based on the at least one first image.

18. The method of claim 13, wherein determining a third coordinate set of at least one third coordinate, the third coordinate set corresponding to the second location of the aircraft, by comparing the at least one location model to at least one terrain database includes:

determining a third coordinate set of at least one third coordinate by comparing the at least one location model to at least one of a DTED dataset and an obstacle database.

19. The method of claim 13, wherein generating at least one second image, the at least one second image based on at least the second coordinate set and the at least one first image includes:

generating at least one second image, the at least one second image including at least one data overlay, the at least one data overlay including at least one data point based on at least one of the second coordinate set and the first image.

20. The method of claim 19, wherein generating at least one second image, the at least one second image including at least one data overlay, the at least one data overlay including at least one data point based on at least one of the second coordinate set and the first image includes:

generating at least one second image, the at least one second image including at least one data overlay, the at least one data overlay including at least one of an altitude, an airport approach, a status of an aircraft component, a glide slope, a velocity, a legend corresponding to at least one of a natural feature or an obstacle, a feature not included in the obstacle database, and a heading.

* * * * *